United States Patent
Winget et al.

Patent Number: 6,053,720
Date of Patent: *Apr. 25, 2000

[54] MOLD FOR USE IN A GAS-ASSISTED INJECTION MOLDING SYSTEM AND GAS PIN ASSEMBLY FOR USE THEREIN

[75] Inventors: Larry J. Winget, 1799 Foxknoll, Leonard, Mich. 48038; John F. Murphy, Imlay City, Mich.

[73] Assignee: Larry J. Winget, Leonard, Mich.

[*] Notice: This patent is subject to a terminal disclaimer.

[21] Appl. No.: 08/935,013

[22] Filed: Sep. 22, 1997

[51] Int. Cl.⁷ .................................................. B29C 45/26
[52] U.S. Cl. ..................... 425/130; 264/572; 425/192 R; 425/546
[58] Field of Search .................................. 425/130, 546, 425/192 R; 264/572

[56] References Cited

U.S. PATENT DOCUMENTS

| | | | |
|---|---|---|---|
| 2,331,688 | 1/1943 | Hobson | 264/536 |
| 2,345,144 | 3/1944 | Opavsky | 264/570 |
| 2,714,747 | 8/1955 | Lindemann et al. | 264/50 |
| 2,714,748 | 8/1955 | Stirnemann et al. | 264/50 |
| 3,021,559 | 2/1962 | Strong | 264/524 |
| 3,135,640 | 6/1964 | Kepka et al. | 264/45.2 |
| 3,687,582 | 8/1972 | Hendry et al. | 425/4 R |
| 3,966,372 | 6/1976 | Yasuike et al. | 425/4 R |
| 4,033,710 | 7/1977 | Hamming | 425/543 |
| 4,078,875 | 3/1978 | Eckhardt | 425/547 |
| 4,082,226 | 4/1978 | Appleman et al. | 425/564 |
| 4,092,389 | 5/1978 | Sakurai | 425/535 |
| 4,101,617 | 7/1978 | Friederich | 425/533 |
| 4,106,887 | 8/1978 | Yasuike et al. | 425/549 |
| 4,129,635 | 12/1978 | Yasuike et al. | 264/529 |
| 4,136,220 | 1/1979 | Olabisi | 264/572 |
| 4,140,672 | 2/1979 | Kataoka | 264/45.1 |
| 4,234,642 | 11/1980 | Olabisi | 264/572 |
| 4,247,515 | 1/1981 | Olabisi | 264/500 |
| 4,333,608 | 6/1982 | Hendry | 425/564 |
| 4,357,296 | 11/1982 | Hafele | 264/532 |
| 4,474,717 | 10/1984 | Hendry | 264/45.5 |
| 4,555,225 | 11/1985 | Hendry | 425/4 R |
| 4,601,870 | 7/1986 | Sasaki | 264/572 |
| 4,604,044 | 8/1986 | Hafele | 425/525 |
| 4,740,150 | 4/1988 | Sayer | 425/557 |
| 5,273,417 | 12/1993 | Nelson | 425/130 |
| 5,273,707 | 12/1993 | Carroll | 264/572 |
| 5,284,429 | 2/1994 | Schneider et al. | 425/130 |
| 5,342,191 | 8/1994 | Shah et al. | 264/572 |
| 5,439,365 | 8/1995 | Hendry | 264/572 |
| 5,639,405 | 6/1997 | Erikson | 264/572 |
| 5,820,889 | 10/1998 | Erikson | 425/130 |
| 5,908,641 | 6/1999 | Erikson | 425/130 |

FOREIGN PATENT DOCUMENTS

| | | |
|---|---|---|
| 2106546 | 8/1972 | Germany . |
| 485726 A2 | 5/1992 | Germany . |
| 57-14968 | 3/1982 | Japan . |
| 1460101 | 12/1976 | United Kingdom . |
| 1487187 | 9/1977 | United Kingdom . |
| 2139548 | 11/1984 | United Kingdom . |

*Primary Examiner*—Robert Davis
*Attorney, Agent, or Firm*—Brooks & Kushman P.C.

[57] ABSTRACT

A mold for use in a gas-assisted injection molding system includes a gas pin assembly which can be readily removed from one mold half in an open position of a mold wherein a porous insert of the assembly can also be readily removed from the housing of the assembly for easy servicing. The housing of the assembly has an elongated aperture formed therethrough in communication with a gas passageway in the mold to permit the flow of gas therethrough. The porous insert is positioned in the aperture. The insert permits the flow of gas therethrough but prevents the passage of molten plastic therethrough. The assembly also includes a holding device preferably in the form of a set screw which has a gas hole formed completely therethrough to permit the flow of gas therethrough. The set screw is threadedly secured within the housing to hold the insert stationary within the aperture and to permit ready removal of the insert from the housing after the set screw has been removed from the housing.

16 Claims, 1 Drawing Sheet

MOLD FOR USE IN A GAS-ASSISTED INJECTION MOLDING SYSTEM AND GAS PIN ASSEMBLY FOR USE THEREIN

TECHNICAL FIELD

This invention relates to molds and gas pin assemblies for use therein and, in particular, molds for use in gas-assisted injection molding systems and gas pin assemblies for use therein.

BACKGROUND ART

The U.S. Pat. No. 5,284,429, to Schneider et al., discloses a mold and gas pin assembly for use in the injection molding of a thermoplastic article. A fluid supply passageway is provided in the mold to allow fluid to be ejected through and communicated to either the thermoplastic flow path or into the article-defining cavity. An end passage of the thermoplastic flow path has a plug disposed therein. The plug includes a porous core which permits the flow of low viscosity fluid such as a gas therethrough, but prevents the passage of molten thermoplastic therethrough. In one embodiment, the plug is threaded into the passageway end portion. When the porous core of the plug becomes substantially filled with thermoplastic, the plug is easily removed and replaced in the first embodiment by merely unthreading the plug. In a second embodiment, the plug is replaced by unthreading two or four fasteners which secure the plug to the stationary mold half. However, in each of these embodiments, in order to service the core, the entire plug must be replaced. In a third embodiment, the core may be serviced but the entire mold half in which the core is secured must be disassembled.

SUMMARY OF THE INVENTION

An object of the present invention is to provide a mold for use in a gas-assisted injection molding system and gas pin assembly for use therein, wherein not only is the gas pin assembly readily removable from the mold, but also a porous insert of the assembly is readily removable from a housing of the assembly.

Another object of the present invention is to provide a mold for use in a gas-assisted injection molding system and gas pin assembly for use therein, wherein a housing and a holding device for holding a porous insert within the housing can accommodate differently sized porous inserts and porous inserts having different micron settings so that a molding operation has increased flexibility to accommodate different types of plastics.

In carrying out the above objects and other objects of the present invention, a mold for use in a gas-assisted injection molding system is provided. The mold includes a first mold half and a second mold half. The first and second mold halves are movable relative to each other between an open position and a closed position. The first and second mold halves define an article-defining cavity. The second mold half includes a gas passageway extending to an interior surface of the second mold half in fluid communication with the article-defining cavity. The mold also includes a gas pin assembly. The assembly includes a housing secured to the second mold half at the interior surface of the second mold half so that the assembly can be readily removed from the second mold half in the open position of the mold. The housing has an elongated aperture formed therethrough in communication with the gas passageway to permit the flow of gas therethrough. The assembly also includes a porous insert positioned in the aperture. The insert permits the flow of gas therethrough but prevents the passage of molten plastic therethrough. The assembly finally includes a holding device having a gas hole formed completely therethrough to permit the flow of gas therethrough. The holding device is removably secured within the housing to hold the insert stationary within the aperture and to permit ready removal of the insert from the housing after the holding device has been removed from the housing.

Preferably, the holding device is adjustably secured within the housing at a desired one of a plurality of possible holding positions along the aperture to permit inserts of varying sizes to be located within the aperture.

Also, preferably, the housing is internally threaded and the holding device is externally threaded. The holding device is completely threaded in the housing at each of the plurality of possible holding positions.

Still, preferably, the holding device is a set screw in abutting engagement with the insert to prevent movement of the insert within the aperture. The housing is a one-piece housing and the set screw is completely disposed within the housing. The housing is externally threaded for attachment to the second mold half within the gas passageway.

Preferably, the housing has an outer peripheral surface adapted to be engaged by a tool. The outer peripheral surface has a plurality of substantially planar surfaces adapted to be engaged by the tool.

Preferably, the porous insert comprises a sintered material selected from the group consisting of aluminum, copper, nickel, steel, bronze, porcelain, and brass.

Still further in carrying out the above objects and other objects of the present invention, in a mold having a first mold half and a second mold half with a gas passageway extending to an interior surface of the second mold half, a gas pin assembly is provided. The assembly includes a housing adapted to be secured to the second mold half at an interior surface of the second mold half so that the assembly can be readily removed from the second mold half in an open position of the mold. The housing has an elongated aperture formed therethrough to permit the flow of gas therethrough. The assembly also includes a porous insert positioned in the aperture. The insert permits the flow of gas therethrough but prevents the passage of molten plastic therethrough. Finally, the assembly includes a holding device having a gas hole formed completely therethrough to permit the flow of gas therethrough. The holding device removably holds the insert stationary within the aperture. The holding device is removably secured within the housing to permit ready removal of the insert from the housing after the holding device has been removed from the housing.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
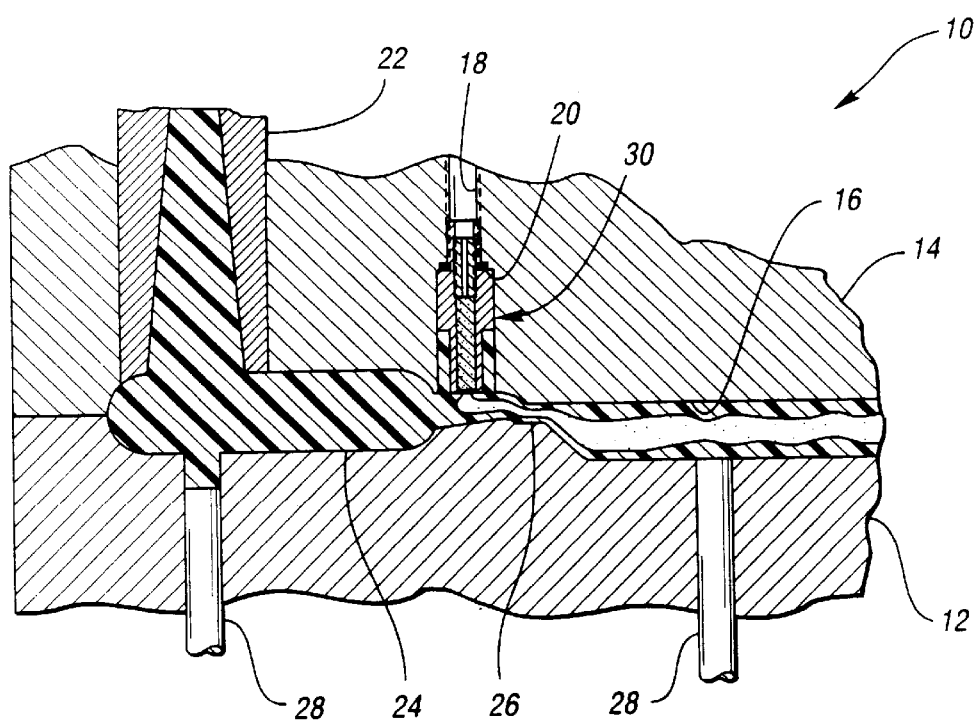
FIG. 1 is a view, partially broken away and in cross-section, of a mold constructed in accordance with the present invention showing a typical gas path through a shot of thermoplastic resin.
Figure 2:
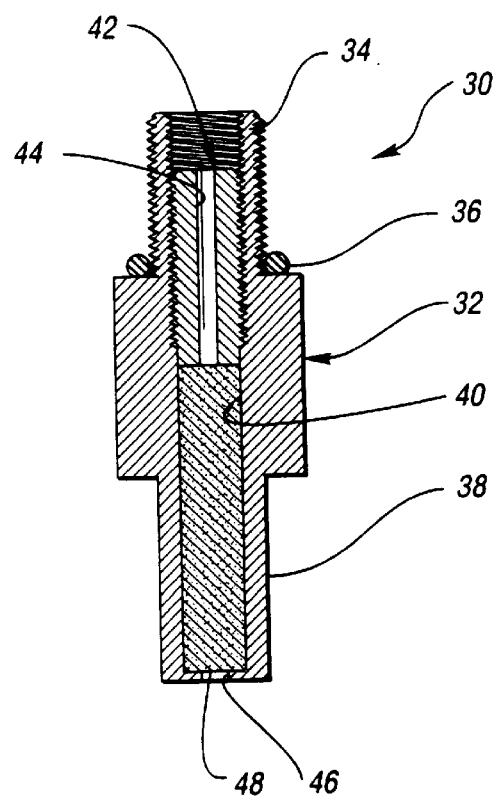
FIG. 2 is an enlarged sectional view of a gas pin assembly constructed in accordance with the present invention.

Referring now to the drawing Figures, there is illustrated in FIGS. 1 and 2 a mold, generally indicated at 10, for use in a gas-assisted injection molding system. The mold 10 includes a first mold half 12 and a second mold half 14. The first and second mold halves 12 and 14, respectively, are movable relative to each other between an open position and a closed position as shown in FIG. 1, wherein the first and second mold halves 12 and 14, respectively, define an article-defining cavity 16.

The second mold half 14 includes a gas passageway 18 which extends from an exterior surface (not shown) of the second mold half 14 to an inner interior surface 20 of the second mold half 14 in fluid communication with the article-defining cavity 16.

The second or stationary mold half 14 includes a sprue 22 for communicating thermoplastic material to a runner 24 which, in turn, communicates with the article-defining cavity 16 via a gate 26. A thermoplastic flow path is defined by the sprue 22, the runner 24 and the gate 26. Article ejector pins 28 can extend through the first or movable mold half 12 to eject a completed part.

Referring now to FIGS. 1 and 2, the mold 10 also includes a gas pin assembly, generally indicated at 30. The gas pin assembly 30 includes a one-piece housing, generally indicated at 32. As shown in FIG. 1, a base portion 34 of the housing 32 is threadedly secured to the second mold half 14 at the interior surface 20 of the second mold half 14 so that the gas pin assembly 30 can be readily removed from the second mold half 14 in the open position of the mold 10. A rubber O-ring 36 is provided about the base portion 34 to seal the housing 32 within the second mold half 14.

The housing 32 also includes a hexagonal head portion 38 so that the assembly 30 can be readily removed from the second mold half 14 in the open position of the mold 10 by a conventional tool (not shown).

The housing 32 includes an elongated aperture 40 formed therein in communication with and aligned with the gas passageway 18 as illustrated in FIG. 1 to permit the flow of gas therethrough.

The base portion 34 of the housing 32 is also internally threaded to threadedly secure therein a holding device in the form of a set screw, generally indicated at 42, which has a gas hole 44 formed completely therethrough to permit the flow of gas therethrough.

The gas pin assembly 30 also includes a porous insert 48 comprising a sintered material such as aluminum, copper, nickel, steel, bronze, porcelain, and brass, which permits the flow of gas therethrough but prevents the passage of molten plastic therethrough. The insert 48 is held in position within the aperture 40 by the set screw 42 at one end thereof and by flanges 46 of the head portion 38 at the opposite end thereof.

The sintered material is preferably a bronze sintered material and can filter out foreign particles down to 20 microns. However, as previously mentioned, the micron size can be varied depending on the type of plastic utilized in the molding process.

The set screw 42 is continuously adjustably secured within the base portion 34 of the housing 32 along the aperture 40 to permit inserts of varying sizes and micron sizes to be located within the aperture 40.

As noted in FIG. 2, the base portion 34 of the housing 32 is internally threaded and the set screw 42 is externally threaded. The set screw 42 is completely threaded in the base portion 34 of the housing 32 at each of the plurality of possible holding positions of the set screw 42 within the base portion 34 of the housing 32.

The mold and gas pin assembly for use therein are constructed in accordance with the present invention and provide numerous advantages. For example, the gas pin assembly 30 can be serviced from the molding face of the mold 10. The housing 32 of the assembly 30 is of a single metal construction and preferably has a porous bronze insert 48. The porous bronze insert 48 can be serviced at the molding site if required. The porous bronze insert 48 allows gas to flow evenly into the mold 10 and also filters out foreign particles down to 20 microns. The porous bronze insert 48 can be exchanged for other sized porous inserts which may be of a different material for various requirements for gas flow (i.e. different micron settings). This gives the molding operation additional flexibility.

Also, the head portion 38 of the housing 32 can have a standard exterior surface such as a hexagonal surface to make installation and service of the pin assembly 30 very easy.

Finally, the pin assembly 30 can be made in various lengths and sizes without departing from the spirit of the present invention.

While the best mode for carrying out the invention has been described in detail, those familiar with the art to which this invention relates will recognize various alternative designs and embodiments for practicing the invention as defined by the following claims.

What is claimed is:

1. A mold for use in a gas-assisted injection molding system, the mold comprising:

a first mold half;

a second mold half, the first and second mold halves being movable relative to each other between an open position and a closed position, wherein the first and second mold halves define an article-defining cavity, the second mold half including a gas passageway extending to an interior surface of the second mold half in fluid communication with the article-defining cavity; and a gas pin assembly including:

a housing secured to the second mold half at the interior surface of the second mold half so that the assembly can be readily removed from the second mold half in the open position of the mold, the housing having an elongated aperture formed therethrough in communication with the gas passageway to permit the flow of gas therethrough wherein the housing is internally threaded with a first plurality of threads;

a porous insert positioned in the aperture, the insert permitting the flow of gas therethrough but preventing the passage of molten plastic therethrough; and a holding device having a gas hole formed completely therethrough to permit the flow of gas therethrough, the holding device being adjustably and removably secured within the housing at a desired one of a plurality of possible holding positions along the aperture to permit inserts of varying sizes to be located within the aperture and to hold the insert stationary within the aperture and to permit ready removal of the insert from the housing after the holding device has been removed from the housing wherein the holding device is externally threaded and has a second plurality of threads less than the first plurality of threads and wherein all of the second plurality of threads are threaded with the second plurality of threads at each of the plurality of possible holding positions.

2. The mold as claimed in claim 1 wherein the holding device is a set screw in abutting engagement with the insert to prevent movement of the insert within the aperture.

3. The mold as claimed in claim 2 wherein the housing is a one-piece housing and wherein the set screw is completely disposed within the housing.

4. The mold as claimed in claim 1 wherein the housing is a one-piece housing externally threaded for attachment to the second mold half within the gas passageway.

5. The mold as claimed in claim 1 wherein the housing has an outer peripheral surface adapted to be engaged by a tool.

6. The mold as claimed in claim 5 wherein the outer peripheral surface has a plurality of substantially planar surfaces adapted to be engaged by the tool.

7. The mold as claimed in claim 1 wherein the porous insert comprises a sintered material.

8. The mold as claimed in claim 7 wherein the sintered material is selected from the group consisting of aluminum, copper, nickel, steel, bronze, porcelain, and brass.

9. In a mold having a first mold half and a second mold half with a gas passageway extending to an interior surface of the second mold half, a gas pin assembly comprising:

a housing adapted to be secured to the second mold half at an interior surface of the second mold half so that the assembly can be readily removed from the second mold half in an open position of the mold, the housing having an elongated aperture formed therethrough to permit the flow of gas therethrough wherein the housing is internally threaded with a first plurality of threads;

a porous insert positioned in the aperture, the insert permitting the flow of gas therethrough but preventing the passage of molten plastic therethrough; and a holding device having a gas hole formed completely therethrough to permit the flow of gas therethrough and removably holding the insert stationary within the aperture, the holding device being adjustably and removably secured within the housing at a desired one of a plurality of possible holding positions along the aperture to permit inserts of varying sizes to be located within the aperture and to permit ready removal of the insert from the housing after the holding device has been removed from the housing wherein the holding device is externally threaded and has a second plurality of threads less than the first plurality of threads wherein all of the second plurality of molds are threaded with the second plurality of threads at each of a plurality of possible holding positions.

10. The assembly as claimed in claim 9 wherein the holding device is a set screw in abutting engagement with the insert to prevent movement of the insert within the aperture.

11. The assembly as claimed in claim 10 wherein the housing is a one-piece housing and wherein the set screw is completely disposed within the housing.

12. The assembly as claimed in claim 9 wherein the housing is a one-piece housing externally threaded for attachment to the second mold half within the gas passageway.

13. The assembly as claimed in claim 9 wherein the housing has an outer peripheral surface adapted to be engaged by a tool.

14. The assembly as claimed in claim 13 wherein the outer peripheral surface has a plurality of substantially planar surfaces adapted to be engaged by the tool.

15. The assembly as claimed in claim 9 wherein the porous insert comprises a sintered material.

16. The assembly as claimed in claim 15 wherein the sintered material is selected from the group consisting of aluminum, copper, nickel, steel, bronze, porcelain, and brass.

* * * * *